May 17, 1966 T. A. PATCHELL 3,252,105
RATE LIMITING APPARATUS INCLUDING ACTIVE ELEMENTS
Filed June 7, 1962
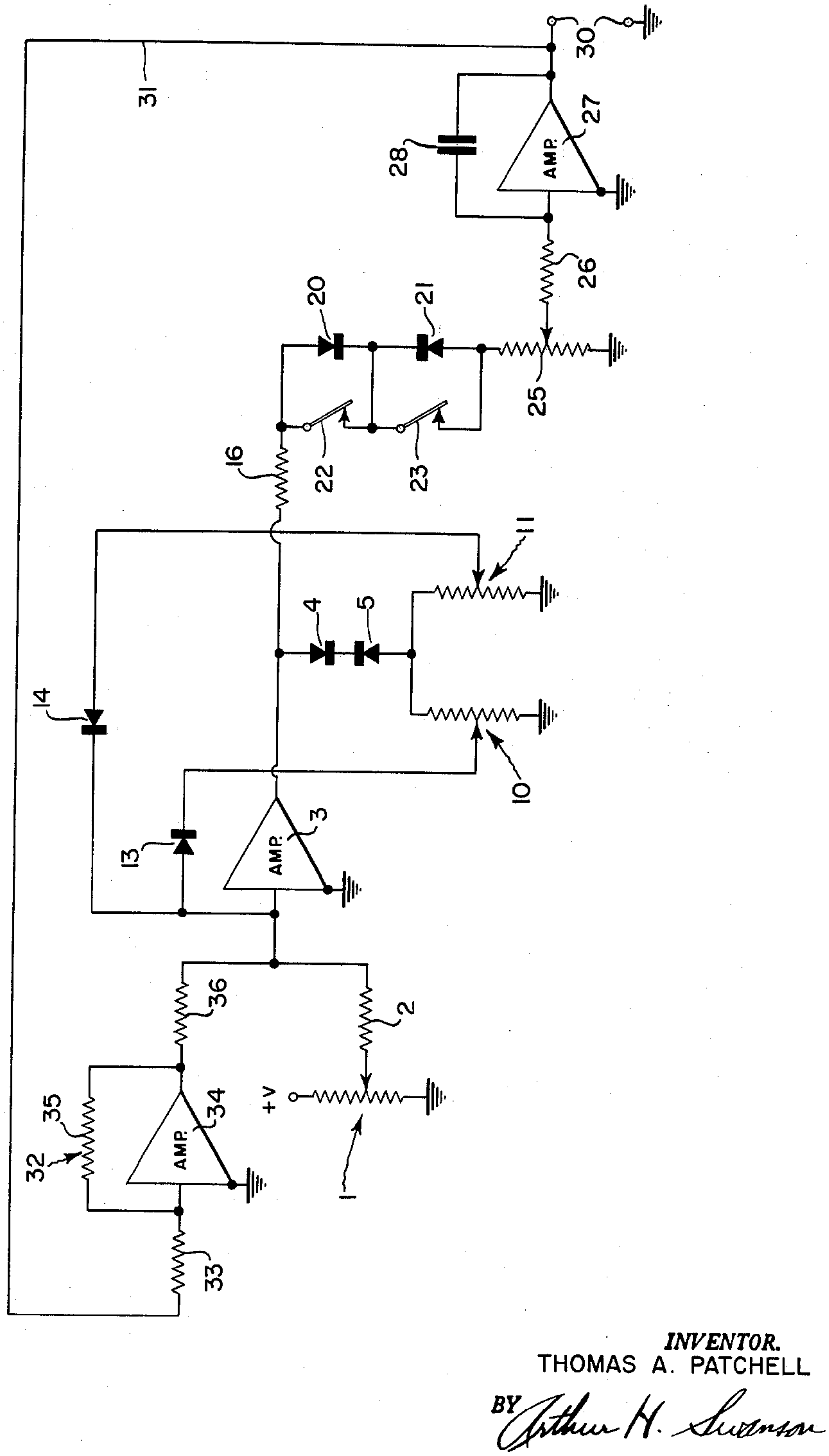
INVENTOR.
THOMAS A. PATCHELL
BY Arthur H. Swanson
ATTORNEY.

3,252,105
RATE LIMITING APPARATUS INCLUDING ACTIVE ELEMENTS

Thomas A. Patchell, Havertown, Pa., assignor to Honeywell Inc., a corporation of Delaware Filed June 7, 1962, Ser. No. 200,738
4 Claims. (Cl. 330—200)

This invention relates to apparatus for regulating or limiting the action of a controller on a controlled device.

More specifically, the present invention relates to rate limiters for limiting the rate of change of a control signal.

An object of the present invention is to provide an improved rate limiting apparatus for producing and rate-limiting a control signal for a controlled device.

Another object of the present invention is to provide an improved rate limiting apparatus having a variable rate-limiting control action for a control signal.

A further object of the present invention is to provide an improved rate limiting apparatus for providing a rate-limiting action for a variable control signal.

A further object of the present invention, as set forth herein, is to provide an improved rate limiting apparatus having a simple operation and construction.

In accomplishing these and other objects, there is provided a rate limiting apparatus having an integrating circuit for providing rate limiting action upon an input signal applied thereto. The input signal is obtained from a comparison of the integrating circuit output signal with a variable reference signal. The comparison operation is performed by an operational amplifier supplying a constant output signal regulated by a Zener diode. The constant output signal is applied to the integrating circuit to change the output signal therefrom. The integrating circuit output signal varies in amplitude at a limited rate until the comparison operation indicates that the output signal is equal to the reference signal. The output signal from the integrating circuit is used as a control signal for device to be controlled. A diode circuit connecting the output signal from the comparison amplifier to the integrating circuit is used to selectively restrict the direction of amplitude variation of the signal applied to the integrating circuit.

A better understanding of the present invention may be had from the following detailed description when read in connection with the accompanying drawing, in which the single figure is a schematic representation of a rate limiting apparatus embodying the present invention.

Referring now to the single figure, there is shown a rate limiter circuit including a set-point potentiometer 1 having its resistance element connected across a source of an energizing signal +V. The slider of the potentiometer 1 is connected through a first input resistor 2 to the input circuit of a first amplifier 3. The output circuit of the amplifier 3 is connected to the anode of a first Zener diode 4. The cathode of the first Zener diode 4 is connected to the cathode of a second Zener diode 5. The anode of the second Zener diode 5 is connected to a common ground connection through two parallel paths, each path comprising the resistance element of a respective potentiometer. Thus, a first potentiometer 10 is connected in one path, and a second potentiometer 11, in the other path.

The slider of the first potentiometer 10 is connected to the cathode of a first feedback diode 13. The anode of the diode 13 is connected to the aforesaid input circuit of the amplifier 3. The slider of the second potentiometer 11 is connected to the anode of a second feedback diode 14. The cathode of the second feedback diode 14 is connected to the anode of the first feedback diode 13.

The output circuit of the amplifier 3 is also connected through a resistor 16 to the anode of a first connecting diode 20. The cathode of the diode 20 is connected to the cathode of a second connecting diode 21. A pair of shorting switches 22, 23 are connected across the diodes 20 and 21, respectively. Thus, the switch 22 is arranged to provide a signal shorting path around the diode 20, and the switch 23 provides a shorting path around the diode 21. With both of the switches 22 and 23 closed, the diodes 20 and 21 are effectively removed from the circuit by the shorting effect of the switches 22 and 23. The anode of the diode 21 is connected to a common ground connection through the resistance element of an output potentiometer 25. The slider of the potentiometer 25 is connected to an integrating circuit including an input resistor 26, an amplifier 27 and a feedback capacitor 28 connected in a feedback circuit around the amplifier 27. The output circuit of the integrating circuit is connected to a pair of output terminals 30 and to a feedback line 31.

The feedback line 31 is arranged to apply the output signal from the integrating circuit as an input signal to an amplifying circuit 32. The amplifying circuit 32 includes an input resistor 33, an amplifier 34 and a feedback resistor 35 for the amplifier 34. The output signal from the amplifier 34 is applied through a second input resistor 36 to the input circuit of the first amplifier 3.

In operation, the rate limiter circuit of the present invention is arranged to provide a signal at the output terminals 30 having a rate of change in signal amplitude determined by the setting of the slider on the potentiometer 25. The input signal to the potentiometer 25 is dependent on an output reference signal from the first potentiometer 1. The input signal +V to the first potentiometer 1 is a predetermined constant signal level suitable for use with a control system to be controlled by the rate limiting action of the present invention. The present invention may be used in combination with a control apparatus to control the load applied to a turbine drive system for an electrical generating apparatus. In this application, the rate limiting operation is used to control the rate of application of an electrical load to the drive system since the rate of application of the load, or desired electrical power, may be beyond the capability of the turbine drive system to provide additional driving power for the generator. Thus, the turbine drive system is limited in its ability to immediately increase its power output, and the rate of application of an electrical load to the generator must be limited to the rate of power output increase capability of the turbine drive system.

In the aforesaid example, the input signal +V may be set at +10 volts to supply an output signal at the slider of the potentiometer 1 representing a preset number of watts of generated power per volt. The setting of potentiometer 1, accordingly, is used to determine the level of generated power to be carried by the electrical generating system. Since, as previously discussed, the turbine drive system is limited in its rate of change in power output, the variation in the electrical power level carried by the generator from a previous power load to a new electrical power load must be rate-limited in order to stay within the turbine capability. The output signal at the terminals 30 is a rate limited signal which changes toward a signal representing the new electrical load at a rate affected by the integration time constant of an integrating circuit comprising the resistor 26, capacitor 28 and amplifier 27. For example, the time constant of the integrating circuit may be preset to give a signal change at the output terminals 30 of 0.25 volt per minute for a one volt input signal applied to the integrating circuit. The input signal for the integrating circuit is obtained from the slider of the potentiometer 25. Accordingly, the rate of change of the output signal at the terminals 30 is determined by the setting of the potentiometer 25. For example, by applying a two volt signal to the aforesaid integrating circuit, the rate of change of the integrator output signal will be 0.50 volt per minute. Thus, the potentiometer 25 is effective to control the rate of change of the output signal at the terminals 30. This output signal may be applied to control the rate of application of an electrical load to an electrical generating system in accordance with the load change capability of the system drive turbine.

The input signal for the potentiometer 25 is obtained from a difference signal obtained by a comparison of the output signal at the terminals 30 and the generation load level signal from the potentiometer 1. For example, assume an equilibrium condition wherein the generating system is operating under a preset electrical load. The output signal at the terminals 30 is effective to maintain the generating system at this load. If it is desired to vary the electrical load level, the potentiometer 1 is adjusted to the new desired level. The comparison of this new signal with the prior output signal at the terminals 30 is effected at the input circuit of the amplifier 3. Specifically, the output signal from the terminals 30 is inverted by an amplifier 34 and is applied to the input circuit of the amplifier 3 to be compared with the output signal from the potentiometer 1. If there is a difference in the amplitudes of the two signals, an error difference signal is applied to the amplifier 3. The polarity of this difference signal will depend on which of the compared signals has the greater amplitude since they are arranged to have opposite polarities as a result of the effect of the inverting amplifier 34.

Assume the error signal has a positive polarity which indicates that the amplitude of the signal from the potentiometer 1 is greater than the output signal fed back from the terminals 30 since the potentiometer is supplied with a positive signal +V. The error signal is amplified and inverted by the amplifier 3 and is applied to the Zener diodes 4 and 5. These diodes are arranged to operate on respective polarities of the output signal from the amplifier 3. Accordingly, a negative output signal from the amplifier 3 is effective to back-bias diode 4 and to pass through diode 5 in a forward, or conducting, direction. The output signal from the amplifier 3 will increase, in response to the input signal, to an amplitude sufficient to drive a back-current through the Zener diode 4. The Zener diode 4 will attempt to regulate this signal by allowing this current to flow through the adjusting potentiometers 10 and 11. The feedback diodes 13 and 14 are connected to respective output signals appearing at the sliders of these potentiometers 10 and 11, which signal is produced by the aforesaid current. The signals appearing at the potentiometer sliders will bias the diodes 13 and 14 in combination with the error signal at the input of the amplifier 3. Since the error signal was assumed to have a positive polarity and the amplifier output signal, a negative polarity, it may be seen that the diode 13 is biased into a forward conducting state. The signal appearing at the slider of the potentiometer 10 is now fed back to oppose the error signal at the input to the amplifier 3. Since this is a negative feedback arrangement, the amplifier 3 now operates as an operational amplifier to supply a feedback signal to the amplifier input circuit to oppose the error signal.

The Zener diodes are effective to produce a constant output signal from the amplifier 3 for any error input signal to force the amplifier 3 to operate near its output signal limit. Thus, an output signal is produced by the amplifier 3 which is constant for any error signal but whose polarity is determined by the polarity of the error signal. If the error signal had a negative polarity indicating that the output signal from the terminals 30 was greater than the potentiometer 1 signal, the operation described above would still be retained with the use of the other Zener diode 5, potentiometer 11 and feedback diode

14. This signal relationship would indicate that a decrease was desired in the electrical load carried by the generating station.

The potentiometers 10 and 11 are used to compensate for circuit components by adjusting the level of the feedback signal to produce the desired feedback condition at the input of the amplifier 3.

The constant input signal is applied through diode shorting switches 22 and 23 to the potentiometer 25. Since the output signal from the integrating amplifier 27 was smaller than the signal from the potentiometer 1, the aforesaid signal from the potentiometer 25 is integrated by the integrating amplifier 27 until the output signal at the terminals 30 is equal to the signal appearing at the slider of the potentiometer 1. This increased output signal is used as a control signal to increase the electrical load carried by the generating station at a rate determined by rate limiting action of the integrating circuit and the potentiometer 25 to the new level called for the setting of the potentiometer 1. When the two input signals compared by the amplifier 3 are equal, the error signal is reduced to a zero level and the circuit is in a balanced condition with no further change in the output signal at the terminals 30.

A decrease in the desired electrical load may be attained by decreasing the signal from the slider of the potentiometer 1. Since this would produce a negative error signal, the further operation of the present would correspond to that described above for a negative error signal. This error signal would be effective to produce a positive input signal to the integrating circuit. The integrating circuit would decrease its output signal to a new level to produce a balanced condition at the input of the amplifier 3. This decrease would also be rate limited and would be used to decrease the electrical load carried by the generating system.

The diodes 20 and 21 may be used to limit the polarity of the signal applied to the potentiometer 25. The effect of this limitation is to prevent either a reduction or an increase in the carried electrical load. For example, if it is desired to allow only a reduction in the carried electrical load and to prevent any further increase therein, the negative output signal from the amplifier 3 must be blocked from appearing across the potentiometer 25 since this polarity will increase the carried load of the generating system, as previously discussed. Accordingly, the switch 22 may be opened to introduce diode 20 into the circuit between the amplifier 3 and the potentiometer 25. This diode 20 will block the negative output signal from the amplifier 3 and allow the positive output signal to appear across the potentiometer 25. Conversely, if only an increase in the carried load is desired, the switch 23 would be opened instead of switch 22 to introduce the diode 21 into the circuit to block the positive output signal from the amplifier 3 from appearing across the potentiometer 25 while allowing a negative signal to pass therethrough. Opening both switches 22 and 23 would block either a positive or a negative signal from reaching the potentiometer 25 to prevent any variation in the electrical load carried by the generating system.

Thus, it may be seen that there has been presented, in accordance with the present invention, a rate limiting circuit for rate-limiting amplitude adjustments of an output signal therefrom in response to an input signal and which is characterized by a variable rate-limiting operation and a selective prevention of either a further increase in the output signal or a further decrease in the output signal, or a prevention of any variation in the output signal.

What is claimed is:

1. A rate-limiting apparatus comprising a signal integrating means, a pair of output terminals, circuit means connecting an output signal from said integrating means to said output terminals, a signal amplifying and comparing means for comparing two input signals applied to an input signal thereof and producing an output signal on an output circuit thereof indicative of a difference between said input signals, a reference signal means, means connecting a signal from said reference signal means as one input signal to said signal comparing means, feedback means connecting an output signal from said integrating means as the other input signal to said comparing means, and signal amplitude regulating means connecting said output signal from said comparing means as an input signal to said integrating means wherein said signal regulating means include a pair of diodes having two similar electrodes connected together and one free electrode connected to said output circuit of said signal comparing means, a potentiometer having its impedance element connected between a second free electrode of said pair of diodes and a common signal return path to said signal comparing means, and circuit means connecting a slider of said potiometer to an input circuit of said integrating means.

2. An operational amplifier comprising a signal amplifying means having an input circuit and an output circuit, a signal amplitude regulating means for said amplifying means including a pair of Zener diodes having two similar electrodes connected together and one of the remaining electrodes connected to said output circuit of said amplifying means, a first potentiometer, a first circuit means connecting an impedance element of said potentiometer between the other one of the remaining electrodes of said Zener diodes and a common signal return path to said amplifying means, a second potentiometer, a second circuit means connecting an impedance element of said second potentiometer between said first circuit means and a common signal return path to said amplifying means, a first feedback diode connected between a slider of said first potentiometer and said input circuit of said amplifying means, and a second diode connected in an opposite electrode relationship to said first diode between a slider of said second potentiometer and said input circuit of said amplifying means.

3. A rate-limiting apparatus comprising a signal integrating means, a pair of output terminals, circuit means connecting an output signal from said integrating means to said output terminals, a signal amplifying and comparing means for comparing two input signals applied to an input circuit thereof and producing an output signal on an output circuit thereof indicative of a difference between said input signals, said comparing means comprising a signal amplifying means having an input circuit and an output circuit, a signal amplitude regulating circuit for said amplifying means including a pair of Zener diodes having two similar electrodes connected together and one of the remaining electrodes connected to said output circuit of said amplifying means, a first potentiometer, a first circuit means connecting an impedance element of said potentiometer between the other one of the remaining electrodes of said Zener diodes and a common signal return path to said amplifying means, a second potentiometer, a second circuit means connecting an impedance element of said second potentiometer between said first circuit means and a common signal return path to said amplifying means, a first feedback diode connected between a slider of said first potentiometer and said input circuit of said amplifying means, and a second diode connected in an opposite electrode relationship to said first diode between a slider of said second potentiometer and said input circuit of said amplifying means, a reference signal means, means connecting a signal from said reference signal means as one input signal to said signal comparing means, feedback means connecting an output signal from said integrating means as the other input signal to said comparing means and circuit means connecting said output signal from said comparing means as an input signal to said integrating means.

4. A rate-limiting apparatus as set forth in claim 3, wherein said last-mentioned means includes a pair of diodes having two similar electrodes connected together and one free electrode connected to the output circuit of said signal comparing means, a potentiometer having its impedance element connected between a second free electrode of said pair of diodes and a common signal return path to said signal comparing means, a first shorting switch connected across a corresponding one of said pair of diodes, a second shorting switch connected across the other one of said pair of diodes and circuit means connecting a slider of said potentiometer to the input circuit of said integrating means.

References Cited by the Examiner

UNITED STATES PATENTS

| | | | |
|---|---|---|---|
| 2,846,522 | 8/1958 | Brown | 330—9 X |
| 3,030,582 | 4/1962 | Holcomb et al. | 328—127 |
| 3,092,729 | 6/1963 | Cray | 330—110 X |

ROY LAKE, *Primary Examiner.*

N. KAUFMAN, *Assistant Examiner.*